United States Patent [19]

Sha et al.

[11] 3,716,807

[45] Feb. 13, 1973

[54] RECURSIVE AUTOMATIC EQUALIZER AND METHOD OF OPERATION THEREFORE

[75] Inventors: Richard T. Sha, Mohegan Lake; Donald T. Tang, Yorktown Heights, both of N.Y.

[73] Assignee: International Business Machine Corporation, Armonk, N.Y.

[22] Filed: May 24, 1971

[21] Appl. No.: 146,371

[52] U.S. Cl. ....................................... 333/18, 325/42

[51] Int. Cl. ............................................... H04b 3/04

[58] Field of Search ............333/18, 70 T, 28; 325/42

[56] References Cited

UNITED STATES PATENTS 3,624,562 11/1971 Fujimura ...............................333/18

*Primary Examiner*—Paul L. Gensler

*Attorney*—Hanifin & Jancin and Thomas J. Kilgannon, Jr.

[57] ABSTRACT

A recursive automatic equalizer with extremely fast convergence is disclosed. The equalizer includes a plurality of equalizer stages connected in cascade which first reduces impulse response of the communication channel to substantially zero. The front portion or sidelobe is reduced to substantially zero distortion by adjusting the tap settings of successive equalizer stages after successive iterations (the first iteration adjusts the tap settings of the first equalizer stage, the second iteration adjusts the tap settings of the second equalizer stage, and so on) such that after $n$ iterations a given initial distortion $D$ is reduced to substantially zero. The tap setting algorithm involved and the method of operating the cascaded equalizer is disclosed. Finally, after $n$ iterations, the output signal which can be described by the function $1-A^{(n)}$ is modified by the reciprocal of the foregoing function and, is this manner, the rear or trailing portion of an input signal which is to be equalized has its rear sidelobe distortion reduced to substantially zero leaving only the desired main pulse. Apparatus for modifying the trailing or rear end of a pulse to be equalized is also disclosed.

26 Claims, 4 Drawing Figures

INVENTORS
RICHARD T. SHA
DONALD T. TANG
BY Thomas J. Kilgannon Jr.
ATTORNEY

RECURSIVE AUTOMATIC EQUALIZER AND METHOD OF OPERATION THEREFORE

BACKGROUND OF THE INVENTION

1. Field of the Invention

This invention generally relates to systems and their method of operation which eliminate or reduce distortion which appears on electrical signals used for digital data transmission. More specifically, it relates to a recursive automatic equalization system and method of operation which has extremely fast convergence, that is, a given amount of distortion can be essentially eliminated in a minimum of time. A preferred implementation consists of a plurality of equalizer stages arranged in cascade, the taps of which are adjusted one stage per iteration and in succession in accordance with an algorithm which reduces the distortion of the front or leading portion of a distorted pulse to substantially zero. After $n$ iterations, the output of the cascaded equalizer stages is applied to a recursive arrangement which reduces the distortion of the trailing or rear portion of the pulse to substantially zero. The output of the cascaded equalizer stages is modified by the recursive portion of the equalizer which performs essentially the reciprocal operation to reduce the input of this recursive portion to only the desired main pulse. In this arrangement, the number of equalizer stages determines the number of iterations used.

2. Description of the Prior Art

When signals are transmitted through a transmission medium, a certain amount of distortion usually results even under noiseless conditions. The distortion encountered may be attributed to the undesirable characteristics of the transmission medium. In the basic form of digital data transmission, symbols from a finite alphabet are transmitted at a fixed rate as pulses of various magnitudes or some other modulated signal wave form. At the receiving end, the received signal is periodically sampled at the same rate to determine what the input signals were. Distortion of the received wave forms results in intersymbol interference between adjacent samples. Typically, a pulse at the transmitter will appear at the receiver to contain a main pulse and a number of "sidelobes" on both sides of the main pulse. In binary data transmission, the sum of the magnitudes of the sidelobes is defined as the total distortion when the main pulse is scaled or normalized to unity.

To minimize undesired intersymbol interference due to linear distortion, filters having compensating characteristics called "equalizers" are used. A special class of time-domain filters is particularly suitable in digital transmissions. Basically, a time-domain filter consists of a number of delay sections in series each section having the same delay, a number of taps between the delay sections with adjustable tap gains, and a summing circuit or element. Two types of time-domain filters are: the nonrecursive or transversal type and, the recursive type. Since the usual channel characteristics are not known beforehand and may be subject to time variations, it is necessary to automatically tune the equalizer to any desired channel. Because of the imperfections in channel characteristics, signals transmitted through a channel are usually accompanied by a certain amount of distortion which can be measured at sampling intervals. The information needed to retrieve each bit in a sequence is completely contained in the sampled values of the received signal. A transversal equalizer is most effective in reducing the distortion in the received signal by operating on sample values. Where the channel characteristics are very stable, a fixed equalizer is adequate. Unfortunately, characteristics of communication channels are not known exactly and, as indicated hereinabove, are subject to time variations. Therefore, it is necessary to make the weights (tap gains) of the transversal equalizer automatically adjustable to their optimum values with respect to a given channel.

Of the two types of time-domain equalizers mentioned hereinabove, the second or recursive type is more efficient in approximating the ideal time-domain response (which usually has infinite duration not easily achieved by nonrecursive equalizers with finite delay sections) and is more economical in actual implementation. In spite of these advantages, recursive equalizers have found little use because of sensitivity problems which become critical in the absence of a satisfactory weight adjusting algorithm. In the past, hybrid type recursive equalizers have been proposed but neither the noise nor the sensitivity problem was considered. In another known recursive arrangement, a recursive equalizer was suggested wherein the front sidelobes were to be suppressed by means of feed-forward paths while the rear sidelobes (after the main pulse) were to be canceled out by means of feedback paths. This technique, however, usually results in an excessive residual front distortion which may lead to the undesirable accumulation of distortion through feedback paths. As of the present time, there is no known systematic algorithm which provides front sidelobe equalization while keeping the overall distortion under control. Herein, lies the main distinction between the prior art recursive equalizers and the equalizer of the present invention.

SUMMARY OF THE INVENTION

The present invention relates generally to methods and apparatuses for equalizing electrical signals which have been subjected to distortion by a transmission medium. The technique involved in equalizing electrical signals involves a method and apparatus which may be characterized as recursive because the front and rear portions of an incoming wave are operated upon separately as opposed to non-recursive techniques which operate on the front and rear portions of an incoming signal simultaneously.

The method of the present invention, in its broadest aspect, comprises the steps of applying an electrical signal sequence represented by the function $1-A^{(0)}$ to an equalizer arrangement having a plurality of adjustable tap settings and equalizing only the front portion of said signal to provide, after $m$ iterations, an output signal represented by the function $1-A^{(m)}$ where $m = 1, 2, 3, \ldots, n$ and $1-A^{(m)} = 1-A_f^{(m)}-A_r^{(m)}$ and, modifying, after $n$ iterations, the function $1-A^{(n)}$ by its reciprocal to reduce the rear end distortion of said signal to a value approaching zero.

More specifically, the invention includes a method for equalizing an electrical signal represented by the function $1-A^{(0)}$ which comprises the steps of applying the electrical signal for $m$ iterations to $m$ equalizer stages each of which have adjustable tap settings. The method then calls for modifying the electrical signal by adjusting the tap settings of the $m^{th}$ equalizer in accordance with the function $1+A_f^{(m-1)}$ to produce successive outputs at each of the stages for successive iterations as represented by the function $1-A^{(m)}$ where $m = 1, 2, 3 \ldots n$, and $1-A^{(m)} = 1-A_f^{(m)}-A_r^{(m)}$ and, modifying after $n$ iterations, the function $1-A^{(n)} \cong 1-A_r^{(n)}$ by its reciprocal to reduce the rear end distortion of said signals to a value approaching zero.

In accordance with still more specific aspects, the method of the present invention which calls for the step of equalizing an electrical signal represented by the function $1-A^{(0)}$, includes the steps of passing the electrical signal through $m$ equalizer stages and modifying the output signal in a summing circuit to provide the function $1+A^{(m-1)}$, where the latter equals $1+A_f^{(m-1)}+A_r^{(m-1)}$. The equalization step also includes the step of feeding a portion of the last mentioned function representing the front end of said signal to a tap adjusting means and, modifying the tap settings of the $m^{th}$ equalizer stage in accordance with the function $1+A_f^{(m-1)}$.

In accordance with still more specific steps, the method of the present invention includes the step of applying the distorted electrical signals to a signal averaging circuit to generate an output signal which is the average of a number of input signals. Other more specific steps include the steps of normalizing the input function at the beginning of each iteration to normalize the main pulse of the electrical signal sequence to unity and initially adjusting the tap settings of the plurality of equalizers to zero with the exception of tap settings which correspond to the main pulse of the sequence, the latter being adjusted to unity.

In its broadest aspect, apparatus for equalizing an electrical signal in accordance with the teaching of the present invention comprises a signal source for producing an electrical signal; a communications medium connected to the signal source which introduces the distortion on the electrical signal to provide a distorted electrical signal represented by the function $1-A^{(0)}$. Also included is means connected to the communications medium for equalizing only the front portion of the distorted electrical signal to provide at the output thereof an output signal represented by the function $1-A^{(m)}$ after $m$ iterations where $m = 1, 2, 3 \ldots, n$, wherein $1-A^{(m)} = 1-A_f^{(m)}- A_r^{(m)}$. Lastly, the apparatus includes means operable after $n$ iterations for modifying the function $1-A^{(n)}$ by its reciprocal connected to the equalizing means to reduce the rear end distortion of the input signal to a value approaching zero.

In accordance with a more specific aspect of the present invention, the equalization apparatus includes a plurality of cascaded equalizer stages each having a plurality of adjustable tap settings, the output of one stage being connected to the input of a succeeding equalizer stage. Means connected to the last of the plurality of equalizer stages and the plurality of adjustable tap settings are called for for modifying the tap settings to produce successive outputs at the $m^{th}$ of the equalizer stages for successive iterations as represented by the function $1-A^{(m)}$ where $m = 1, 2, 3 \ldots n$, $1-A^{(m)} = 1-A_f^{(m)}-A_r^{(m)}$. Also included are means operable after $n$ iterations for modifying the function $1-A^{(n)}$ by its reciprocal connected to the means for modifying the tap settings to reduce the total distortion of the input signal to a value approaching zero.

In accordance with still more specific aspects of the present invention, summer circuits which convert the function $1-A^{(m-1)}$ to $1+A^{(m-1)}$ are called for. In addition, averaging circuits for generating an output signal which is the average of a plurality of input signals are called for and the equalizer stages are characterized as being either of the tapped delay line or shift register types.

The above mentioned method and apparatus permits equalization of distorted digital and analog signals at extremely high convergence rates. This is very significant at a time when central processing units are being asked to service a large number of remote terminals using commercially available communications, i.e., telephone lines. Under such circumstances maximum equalization of a distorted signal should be achieved in a minimum time to render the transmission of data less costly for the user and more highly efficient for the data processor. The apparatus and method of the present invention is believed to satisfy both of the aforementioned requirements. In addition, the use of the recursive technique permits substantial savings in hardware inasmuch as fewer delay sections per equalizer stage are required as compared with non-recursive techniques similar to that disclosed in a copending application entitled, "A Cascaded Automatic Equalizer" Ser. No. 103,235, filed Dec. 31, 1970 in the names of R. T. Sha and D. T. Tang and assigned to the same assignee as the present invention.

It is, therefore, an object of the present invention to provide method and apparatus for equalizing an electrical signal which has extremely fast convergence.

Another object is to provide an automatic equalizer and method of operation therefor which is suitable for use with both digital and analog signals.

Still another object is to provide a recursive equalization technique which includes cascaded equalizer stages which can be simply and economically implemented.

The foregoing and other objects, features and advantages of the present invention will be apparent from the following more particular description of preferred embodiments as illustrated in the accompanying drawings:

DESCRIPTION OF PREFERRED EMBODIMENTS

Figure 1A:
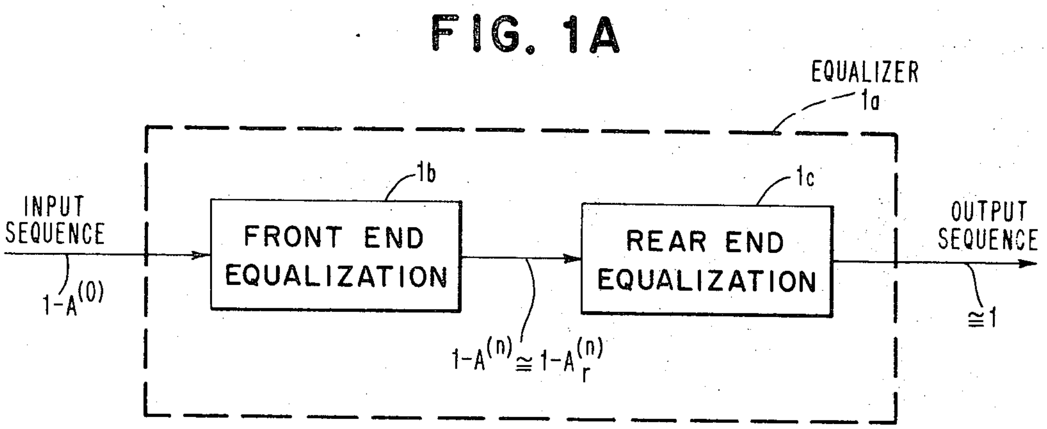
FIG. 1A is a block diagram of a generalized recursive equalizer in accordance with the present invention which includes separate front and rear end equalizers which modifies an input sequence represented by the function $1-A^{(0)}$ to provide an equalized output sequence substantially equal to 1.

Referring now to FIG. 1A, there is shown therein a block diagram of a recursive equalizer which is a generalized version of a particular embodiment of the present application to be discussed in detail hereinbelow.

Let $\{\alpha_k^{(0)}\} = \alpha_{-N}^{(0)}, \ldots, \alpha_{-1}^{(0)}, \alpha_0^{(0)}, \alpha_1^{(0)}, \ldots, \alpha_N^{(0)}$ be sampled values of the output of the transmission medium in response to a unit pulse input. Then, $\{\alpha_k^{(0)}\}$ is also the input sequence to the equalizer and can be decomposed as the main pulse (normalized as unity) and the sidelobes, $A^{(0)}$. In terms of Z-transform expansion, the original channel response is $$\Lambda^{(0)} = \sum_{k=-N}^{N} \alpha_k^{(0)} z^{-k}$$

The initial distortion sequence can be defined as $$A^{(0)} = 1 - \Lambda^{(0)} = 1 - \sum_{k=-N}^{N} \alpha_k^{(0)} z^{-k}$$

Thus $1-A^{(0)}$ represents an input sequence to the equalizer arrangement shown in FIG. 1A. The term $A$ represents the contribution of the front and rear sidelobes associated with the main pulse; the summation of the individual contributions at sampling instants for both front and rear sidelobes being equal to the absolute value of distortion. Consider the distortion in the output sequence of the $(m)^{th}$ stage represented by $$A^{(m)} = \alpha_{-l}^{(m)} z^{l} + \alpha_{-l+1}^{(m)} z^{l-1} + \ldots + \alpha_{-1}^{(m)} z + 1 - \alpha_0^{(m)} + \alpha_1^{(m)} z^{-1} + \ldots + \alpha_{l-1}^{(m)} z^{-l+1} + \alpha_l^{(m)} z^{-l};$$

where $(m \leq n)$

The foregoing represents the contribution to the distortion of the front and rear sidelobes and can be represented by:

$$A^{(m)} = \sum_{k=-l}^{-1} \alpha_k^{(m)} z^{-k} + 1 - \alpha_0^{(m)} + \sum_{k=1}^{l} \alpha_k^{(m)} z^{-k}$$

wherein the contributions are at the sampling instants, for both front and rear sidelobes and can be further written as:

$$A^{(m)} = A_f^{(m)} + A_r^{(m)}$$

where $$A_f^{(m)} = \sum_{k=-l}^{-1} \alpha_k^{(m)} z^{-k} + 1 - \alpha_0^{(m)} \text{ and } A_r^{(m)} = \sum_{k=1}^{l} \alpha_k^{(m)} z^{-k}$$

Thus, the input signal sequence to the equalizer arrangement $1a$ of FIG. 1A may be characterized as:

$$1 - A^{(m)} = (1 + A_f^{(m-1)})(1 - A^{(m-1)}) \quad (1)$$

where $m = 1, 2 \ldots, n$

The front end distortion after undergoing equalization for $n$ iterations is bounded by:

$$D_f^{(n)} = \sum_{k=-l}^{-1} |\alpha_k^{(n)}| + |1 - \alpha_0^{(n)}|$$

$$D^{(n)}{}_f \leq D_f^{(0)} [D^{(0)}]^n \quad (2)$$

and, $$D^{(n)} \leq D^{(n-1)} \leq \ldots \leq D^{(0)} \quad (3)$$

Since one can make $D_f^{(n)}$ as small as desired with sufficiently large $n$, as long as the initial distortion is less than unity, and since the overall distortion after $n$ iterations is equal to or smaller than the initial distortion, $D^{(0)}$, it follows that the rear end sidelobes can be practically eliminated by feeding back the negative amount of the corresponding rear end sidelobes. Because front end equalization has been carried out, such that the contribution to distortion of the front sidelobes is substantially eliminated, it follows, in FIG. 1A that the output after front end equalization in $1b$ is approximately equal to the input signal minus the contribution to distortion of the rear sidelobes only $(1-A_r^{(n)})$. By then carrying out rear end equalization in $1c$ the contribution of the rear end sidelobes to distortion is substantially eliminated and the output sequence, is approximately equal to the value of the main pulse or approximately unity.

The "eye opening" after accomplishing rear end equalization by a decision feedback technique satisfies the equation:

$$I \geq 1 - \frac{D_f^{(n)}}{1 - D_r^{(n)}} \quad (4)$$

In providing a method and apparatus to accomplish recursive equalization of a signal, it has been recognized that an input sequence as shown in Equation (1) can be modified in such a way that an output is produced which is represented by the function $1-A^{(n)}$ where $1-A^{(n)} = 1-A_f^{(n)}-A_r^{(n)}$; where $A_f^{(n)}$ and $A_r^{(n)}$ represent the summation, at given sampling intervals of the contribution of the front and rear sidelobes, respectively, to the overall distortion. By ignoring the contribution of the rear sidelobes, the output function $1-A^{(n)}$ can be accomplished by successively modifying in the $m^{th}$ stage the input $1-A^{(m-1)}$ by the transfer function $1+A_f^{(m-1)}$ where $m = 0, 1, 2, 3, \ldots, n$. At this point, it should be appreciated that although the contribution due to the rear end sidelobe is substantially ignored, it is recognized that the presence of the rear sidelobe affects the front sidelobe in a rather complex manner.

Characterizing the modifying function in the same manner, the general modifying function $1+A^{(m-1)}$ (this results from the usual equalizer operation wherein the output of the $(m-1)$ equalizer stage, the center tap of which has been set to $2-\alpha_0^{(m-1)}$, is modified in a summer to convert the output $1-A^{(m-1)}$ to the negative of the values of the signal sequence represented by $A$ and using these values to adjust tap settings on the equalizer) becomes $1+A_f^{(m-1)}$ because the contribution due to the rear sidelobe is being ignored. Also, characterizing the input function in the same manner, the generalized input function becomes $1-A^{(m-1)}$. This results from the fact that the output for any iteration becomes the input to the equalizer for a succeeding iteration.

From the foregoing, the input function for each iteration, the modifying function and the output function for each iteration may be determined. Table I below shows the value of each function after each iteration.

TABLE I

| Iteration $m$ | Input to $m^{th}$ Stage $1-A^{(m-1)}$ | Modifying Function for $m^{th}$ Stage $1+A_f^{(m-1)}$ | Output for $m^{th}$ Stage $1-A^{(m)}$ |
|---|---|---|---|
| Initialize | $1-A$ | | $1-A^{(0)}$ |
| 1 | $1-A^{(0)}$ | $(1+A_f^{(0)})$ | $1-A^{(1)}$ |
| 2 | $1-A^{(1)}$ | $(1+A_f^{(1)})$ | $1-A^{(2)}$ |
| 3 | $1-A^{(2)}$ | $(1+A_f^{(2)})$ | $1-A^{(3)}$ |
| 4 | $1-A^{(3)}$ | $(1+A_f^{(3)})$ | $1-A^{(4)}$ |
| $n$ | $1-A^{(n-1)}$ | $(1+A_f^{(n-1)})$ | $1-A^{(n)}$ |

During the period prior to the first iteration, the output function $1-A^{(0)}$, as shown in Table I, is the same as the input because all of the tap settings on front end equalizer 1*b* have been set to zero except the rightmost tap which is set to $2-\alpha_0^{(m-1)}$. For each succeeding iteration, Table I gives the value of the input required, the modifying function and the output obtained from front end equalizer 1*b* of FIG. 1A. Having recognized the relationship between the input function, the output function and the modifying function, the values in Table I are obtained by simply substituting the iteration number for $m$ in each of the generalized functions.

Based on the foregoing, the generalized method of operation of a recursive equalizer may be characterized by the steps of applying an electrical signal sequence represented by the function $1-A^{(0)}$ to an equalizer arrangement and equalizing only the front portion of said signal to provide after $m$ iterations an output signal represented by the function $1-A^{(m)}$ where $m = 1, 2, 3 \ldots, n$ and $1-A^{(m)} = 1-A_f^{(m)}- A_r^{(m)}$ and modifying after $n$ iterations the function $1-A^{(n)}$ by its reciprocal to reduce the rear end distortion of the signal to a value approaching zero. While this treatment does not characterize the modifying function, it should be clear that the input function $1-A^{(0)}$ may be modified in a number of ways to produce the desired output function $1-A^{(n)}$. One arrangement for producing the desired output in accordance with the input function and the modifying function referred to in Table I above is shown in FIG. 1B.

Figure 1D:
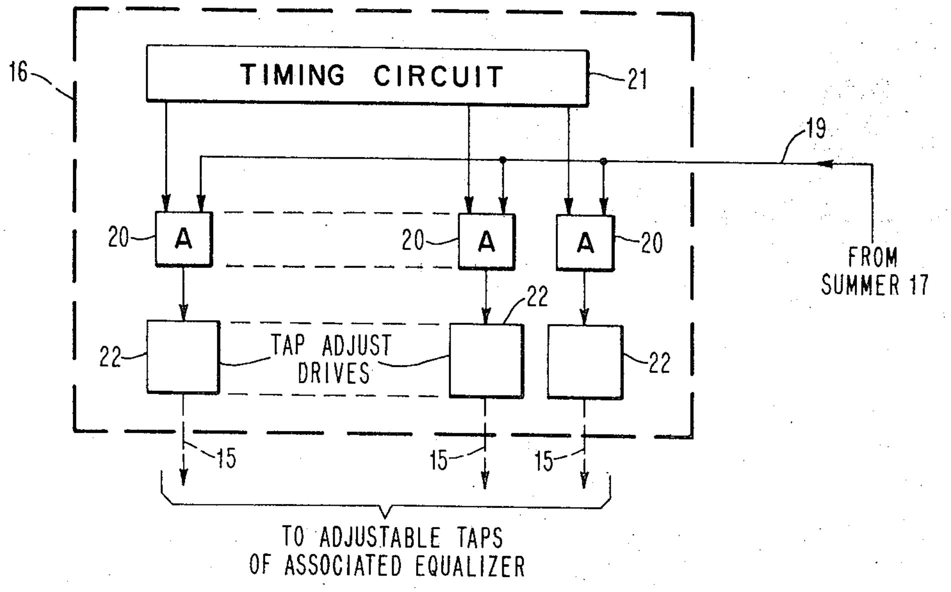
FIG. 1D is a block diagram of the tap adjusting means shown in FIG. 1B showing the conversion of the output sequence of the summing amplifier to signals which adjust the taps of an associated equalizer stage.
Figure 1B:
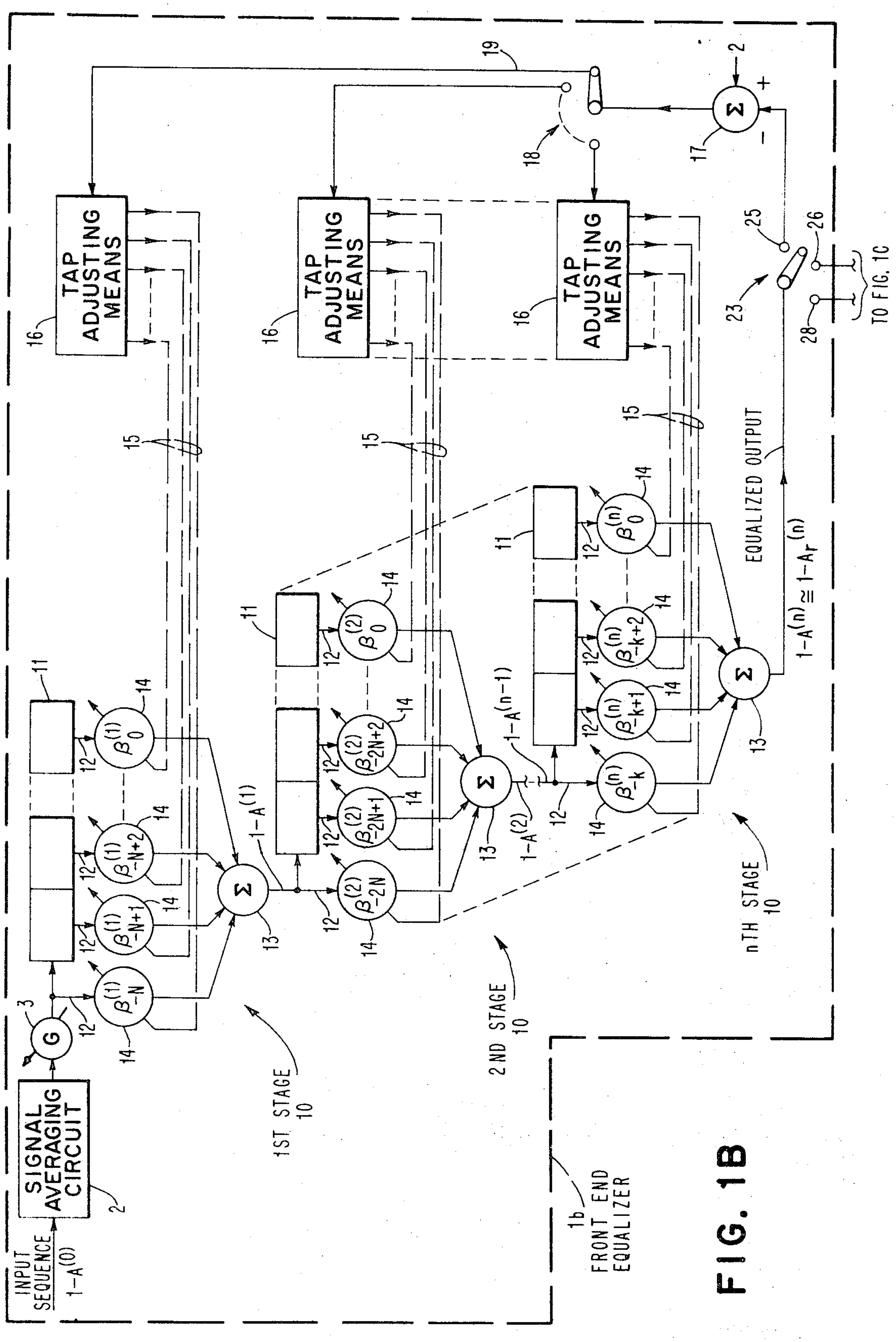
FIG. 1B is a partial schematic, partial block diagram of a portion of a recursive equalizer in accordance with the present invention showing a front end equalizer which consists of a plurality of cascaded equalizer stages, their associated adjustable tap settings, a summing circuit which modifies the output of the $(m)^{th}$ equalizer, and tap adjusting means associated with each equalizer which adjusts the tap settings in accordance with the modified output of the $(m)^{th}$ equalizer.

Referring now to FIG. 1B, there is shown therein an embodiment of a front end equalizer structure 1*b* consisting of cascaded stages 10 of transversal filters. In this arrangement, the output of a transmission line or other channel provides the input sequence which may be represented by the function $1-A^{(0)}$ to the first of the cascaded stages 10 of equalizer 1*a*. The improved signal at the output of one stage 10 feeds a succeeding stage 10 and so on.

In FIG. 1B, an input sequence $1-A^{(0)}$ is fed to a signal averaging circuit 2. The function of signal averaging circuit 2 is to minimize the effect of random noise in the input sequence on the optimal tap gain settings of the cascaded equalizer. Signal averaging circuits are well known to those skilled in the electronics art and since it forms no part of the present invention and, indeed, is not even a necessary component in the operation of the cascaded equalizer stages, no further details will be given until later. A variable gain arrangement 3 consisting of a variable attenuator or amplifier adjusts the amplitude of the main pulse of the input sequence to a desired value. An input sequence represented by the function $1-A^{(0)}$ is then applied to a plurality of equalizer stages 10 all of which are substantially identical differing only in the number of delay sections and adjustable taps from stage to stage. Thus, the description that follows applies to each of the cascaded stages 10; the output of one stage 10 being applied to the input of the succeeding stage 10.

In FIG. 1B, each equalizer stage 10 comprises a uniform delay line 11 having taps 12 uniformly spaced along the length thereof at desired intervals. A shift register having a plurality of individual stages may be substituted in place of delay line 11 without departing from the spirit and scope of the present invention. Taps 12 are connected to an output via a summing amplifier 13 or other device that permits signal addition. Signal multipliers 14 are interposed between individual taps 12 from delay line 11 and summing amplifier 13. Signal multipliers 14 may be any one of a number of devices well known to those skilled in the equalizer art which may be adjusted either electrically or mechanically to provide desired tap settings of proper values and polarities. In the present arrangement, it is the adjustment of multipliers 14 to values as determined by the algorithm utilized which determines the transmission characteristic of the overall system. Dashed lines 15 connected to the arrow associated with each of multipliers 14 represents a mechanical linkage from tap adjusting means 16 shown in block diagram form in FIG. 1B and more specifically indicated in FIG. 1D. Once the tap settings of multiplier 14 have been set to their final condition, an input sequence is passed via summing amplifier 13 from the output of one stage to the input of a succeeding stage. The output of the first equalizer stage 10, during the first iteration, passes through each succeeding equalizer stage until it reaches the output of the $n^{th}$ stage 10, at which point, the input function $1-A^{(m1)}$ is converted to the function $1+A^{(m-1)}$ in a summing circuit 17 which, in effect, adds 2 to the inverse of the input function. Generally, this summing function is accomplished by detecting the center of the input sequence using a threshold detector. Upon detecting the center pulse, a gate is opened and a value 2 is added to the value of the center pulse. This operation may be characterized mathematically as:

$$2-(1-A^{(m)}) = 1+A^{(m)}$$

Analog or digital versions of summing circuits are well known to those skilled in the computer and equalizer art. Typical analog embodiments may be found in a volume entitled, "Analog Computation" by A. S. Jackson, McGraw-Hill Book Company, 1960, page 47. Typical digital versions may be found in "Analog and Digital Computer Technology," by N. Scott, McGraw-Hill Book Company, 1960, page 325.

The output of summing circuit 17 is applied to a switch 18 which is schematically shown in FIG. 1B. Switch 18 may be any mechanically or electronically actuated switch which is capable of connecting an input to one of a plurality of output contacts. In FIG. 1B, all of the output contacts of switch 18 are shown connected to tap adjusting means 16 which are shown as blocks in FIG. 1B. Each of the tap adjusting means 16 provides an output which is utilized to adjust the tap settings represented by arrows on multipliers 14. The tap settings of multipliers 14 are adjusted by mechanical linkages which are represented by dashed lines 15 in FIG. 1B which emanate as outputs from tap adjusting means 16.

Utilizing this general arrangement, the modified output of the cascaded equalizer stages 10 of FIG. 1B is selectively applied to tap adjusting means 16 associated with a particular equalizer stage 10. The tap adjusting means 16 is activated by the output from summer 17 and, the latter provides outputs which are weighted in accordance with the particular output function.

An arrangement which may be utilized for tap adjusting means 16 is shown in block diagram form in FIG. 1D. The output of the cascaded stages 10 is supplied via a conductor 19 to a plurality of AND gates 20. The number of AND gates 20 is equal to the number of multipliers 14 associated with an equalizer stage 10. A timing circuit 21 provides a separate connection to each of the AND gates 20. Each AND gate 20 provides an output when there is coincidence between a timing circuit pulse applied to AND gate 20 from timing circuit 21 and a sampled value of the output of the cascaded equalizers after a single iteration. At this point, it should be appreciated that only those samples having to do with the front sidelobe are utilized to adjust taps 12 of equalizer stage 10. By setting the timing, and the rightmost multiplier 14 of each stage 10 to $2-\alpha_0^{(m-1)}$ the tap settings of the remaining multipliers 14 will be adjusted to reflect the opposite of the value originally appearing at that sampling instant. The output of AND gates 20 is applied to tap adjust drives shown as blocks 22 in FIG. 1C. Tap adjust drive 22 may include a small motor, the output of which is proportional to the output of an associated AND gate 20. These arrangements are so well known to those skilled in the equalizer art that a detailed explanation of the tap adjust drive is unnecessary. U.S. Pat. No. 3,289,108, in the name of Davey et al., issued Nov. 29, 1966 shows in FIGS. 2 and 3 thereof a multiplier arrangement and control signal producing circuitry, respectively, which could be utilized in the practice of the present invention. Tap adjust drives 22 provide a mechanical output proportional to the output of AND gates 20 which is mechanically coupled via linkages represented by dotted lines 15 to the adjustable multipliers 14 associated with an equalizer stage 10. From the foregoing, it may be appreciated that the output of each of the cascaded equalizer stages 10, for each iteration, is provided to a different tap adjusting means 16 so that each succeeding input sequence is changed to the extent that the tap settings of an equalizer stages 10 has been changed during a previous iteration.

Figure 1C:
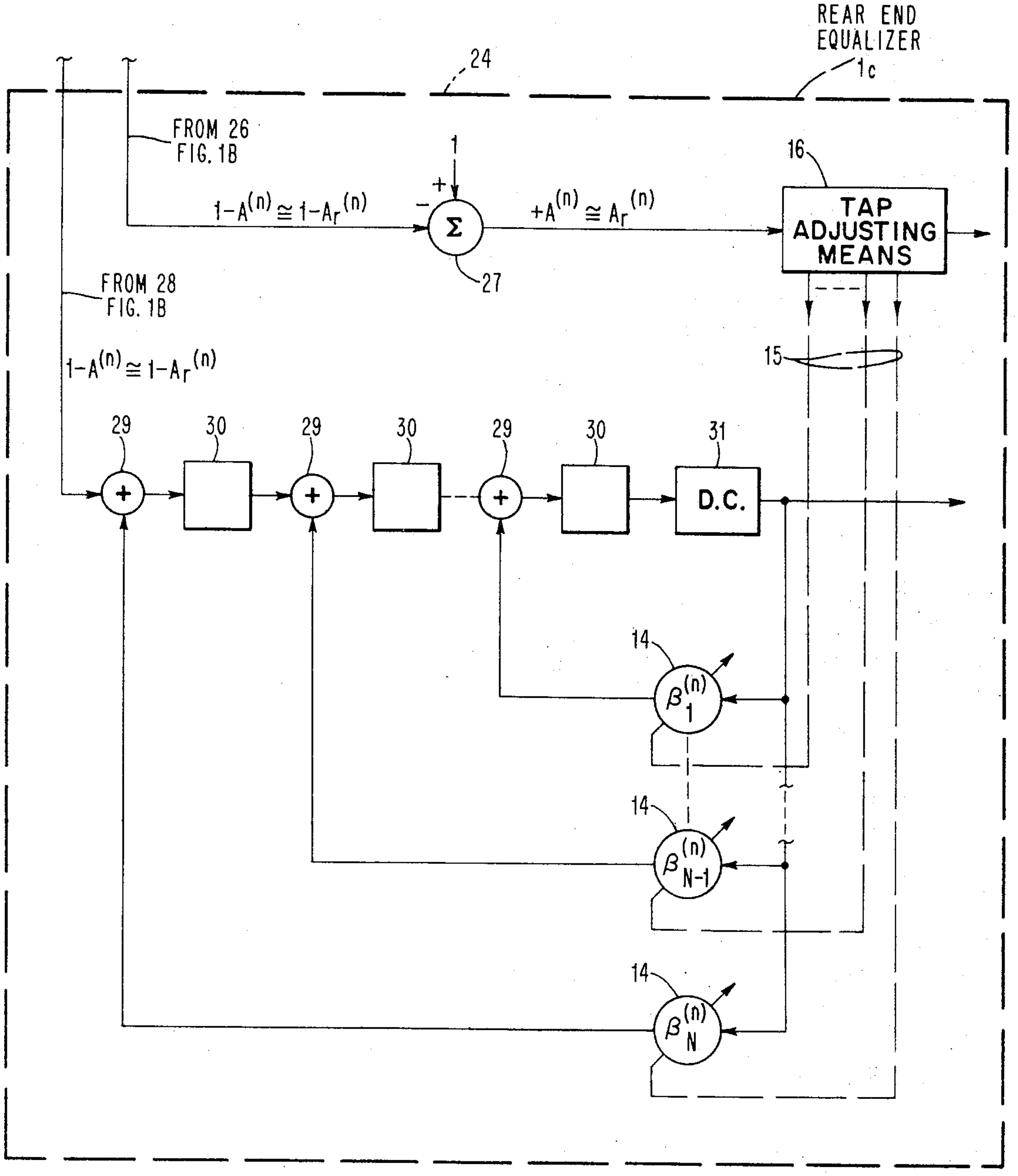
FIG. 1C is a partial schematic, partial block diagram of a portion of a recursive equalizer showing a rear end equalizer which consists of a circuit which modifies the output of the last equalizer stage, after $n$ iterations, by its reciprocal to reduce the distortion of the rear end or trailing edge of a signal to substantially zero.

Finally, after $n$ iterations, the output of summer 13 of the $n^{th}$ stage 10 is passed via a switch 23 to the rear end equalizer 1c of FIG. 1A and 1C and hereafter indicated as equalizer 24. At this point, it should be appreciated that the output of summer 13 of the $n^{th}$ equalizer stage 10 has the form $1-A^{(n)}$ which, because the front end equalization has reduced the front end distortion to substantially zero, is approximately equal to $1-A_r^{(n)}$. Thus, all that remains to be accomplished is to reduce the rear end distortion to approximately zero.

Switch 23 which was actuated at the beginning of the $n^{th}$ iteration to move from contact 25 to contact 26, applies the output of summer 13 of $n^{th}$ equalizer stage 10 to a summing circuit 27 which, in effect, adds 1 to the inverse of the input function. This operation may be characterized mathematically as $1-(1-A^{(n)})$ but, since $1-A^{(n)} \cong 1-A_r^{(n)}$, the output of the summer can be written as:

$$1-(1-\alpha_1^{(n)}z^{-1}-\alpha_2^{(n)}z^{-2}-\alpha_3^{(n)}z^{-3}-\ldots-\alpha_N^{(n)}z^{-N}) = \alpha_1^{(n)}z^{-1}+\alpha_2^{(n)}z^{-2}+\alpha_3^{(n)}z^{-3}+\ldots+\alpha_N^{(n)}z^{-N}.$$

The latter represents the negative of the values of the rear end distortion at the sampling instants which is applied to a tap adjusting means 16 connected to the output of summing circuit 27. Tap adjusting means 16 is activated by the output from summing circuit 27 and, as previously described, provides outputs which are weighted in accordance with the values of the inputs at the sampling instants.

Prior to the interval immediately succeeding the $n^{th}$ iteration, switch 23 is moved from contact 26 to contact 28 and the output of summer 13 of $n^{th}$ equalizer stage 10 is fed to a plurality of serially disposed summing circuits 29 which are interleaved with a plurality of delay elements 30. A serially disposed decision circuit 31 is connected to the last of the delay elements 30 and provides an output equal to unity when a signal exceeds a desired threshold. At all other times, decision circuits 31 provides an output equal to zero. For one thing, decision circuit 31 prevents the spurious interaction of closely spaced pulses which, if decision circuit 31 were not present, might provide a summed signal equal to or greater than the desired value of unity. The output of decision circuit 31 is connected to a plurality of multipliers 14 which are similar in every respect to the multipliers 14 which have been previously described in connection with the front end equalization. Each multiplier 14 is connected in turn to a summing circuit 29 there being one multiplier 14 for each summing circuit 29. Recalling now that multipliers 14 are adjustable as indicated by arrows on multipliers 14, tap adjusting means 16 provides outputs which are utilized to adjust the tap settings of multipliers 14 via mechanical linkages which are represented by dashed lines 15.

Thus, during the $n^{th}$ iteration tap adjusting means 16 provides outputs which are proportional to the negative of the values of the rear end of the input signal obtained at the sampling instants. During the interval after the $n^{th}$ iteration, the output of the summer 13 of the $n^{th}$ equalizer stage is fed via contact 28 of switch 23 to summing circuits 29 and delay elements 30. Since the front end of the input signal is substantially zero at this point, the output of decision circuit 31 is zero until the main pulse of the input signal triggers decision circuit 31 to provide an output equal to 1. This signal is fed to multipliers 14 which have been previously adjusted to desired values and outputs are provided to each of the summing circuits 29 such that the output of each summing circuit 29 is equal to zero. At this point, the rear end of the input signal has been reduced to approximately zero, and, in addition, the overall distortion of the input signal is approximately equal to zero.

The operation of the front end equalization portion shown in FIG. 1B is as follows: The tap settings of multipliers 14 associated with each of the equalizer stages 10 are first set to zero with the exception of the multiplier associated with the main pulse of the input signal. This multiplier is the last multiplier 14 on the right hand side of each of the equalizer stages 10. An input sequence represented by the function $1-A^{(0)}$ is then applied to the input of the first equalizer stage 10. Because all the tap settings of multipliers 14 are all set to zero with the exception of the multipliers associated with the main pulse of the input signal, the input sequence $1-A^{(0)}$ passes through all the equalizer stages 10 and appears at the output of the $n^{th}$ stage substantially unchanged from the input sequence $1-A^{(0)}$. Upon passing through summing circuit 17, an output $1+A^{(0)}$ is provided. As indicated previously, the output $1+A^{(0)}$ is equal to $1+A_f^{(0)}+A_r^{(0)}$. This output consisting of the negative of the front and rear sidelobes at the sampling instants, is applied via a contact on switch 18 to the tap adjusting means 16 associated with the first equalizer stage 10. The tap settings of multipliers 14 of the first equalizer stage 10 are then adjusted according to the function $1+A_f^{(0)}$. Note that those samples associated with the rear sidelobe have been dispensed with and only those samples associated with the front sidelobe are utilized to adjust the tap settings of multipliers 14. In actual practice, the setting of multipliers 14 consists of setting a plurality of potentiometers or attenuators to desired values. Thus, for each multiplier, a value is provided which substantially cancels or modifies the front sidelobe of the input sequence to reduce that lobe to a minimum.

The input sequence $1-A^{(0)}$, for the first iteration, is applied to the first of equalizer stages 10. This input sequence is modified by the tap setting function $1+A_f^{(0)}$ and provides at the output of the summing amplifier 13 of the first of the equalizer stages 10, an output represented by the function $1-A^{(1)}$.

Recognizing that the term $1-A^{(0)}$ can be written as $1-A_f^{(0)}-A_r^{(0)}$, this function upon passing through the first of the equalizer stages 10 is modifed by the function $1+A_f^{(0)}$. This results in the function $1-A_f^{(0)2}-A_r^{(0)}-A_f^{(0)}A_r^{(0)}$ as the output of the first of the equalizer stages 10. It is noted that even though the rear sidelobes are ignored during processing that the input signal which contains both front and rear sidelobes provides an output which is to some extent a function of the rear sidelobe. By characterizing all the terms after the first as $-A^{(1)}$, the output of the first of equalizer stages 10 may be represented by the function:

$$1-A^{(1)}.$$

This output now passes through each of the remaining equalizer stages 10 substantially unchanged and appears at the output of summing amplifier 13 of the $n^{th}$ of equalizer stages 10 as an output represented by the function $1-A^{(1)}$. This output is applied to summer 17 and results at the output of summer 17 in the function $1+A_f^{(1)}$. This function is applied via a contact on switch 18 to the tap adjusting means 16 associated with the second of the equalizer stages 10. Tap adjusting means 16 then adjusts multipliers 14 associated with the second of equalizer stages 10 in accordance with the function $1+A_f^{(1)}$.

An input sequence $1-A^{(0)}$, for the second iteration, is applied to the input of the first of equalizer stages 10 where it is modified by tap settings of that equalizer stage to provide at the output of summer 13 associated with the first equalizer stage 10 the function $1-A^{(1)}$. This output becomes the input to the second of equalizer stages 10 and is modified therein by the tap settings of multipliers 14 associated with the second of equalizer stages 10 in accordance with the function $1+A_f^{(1)}$ to produce at the output of summer 13 associated with the second of equalizer stages the output represented by the function $1-A^{(2)}$. This latter function is obtained in accordance with the following rational:

The input to the second of the equalizer stages 10 has been characterized as $1-A^{(1)}$ hereinabove. In the second of the equalizer stages, this input is modified by the tap setting $1+A_f^{(1)}$. Multiplying the input by the modifying function, the output $1-A_r^{(1)}-(A_f^{(1)})^2-A_f^{(1)}A_r^{(1)}$ is obtained. If all the terms after the first are characterized as $-A^{(2)}$, the output of the second equalizer made be defined as $1-A^{(2)}$. This output is characterized in terms of contributions from both front and rear sidelobes. Thus, $1-A^{(2)}$ may be written as $1-A_f^{(2)}-A_r^{(2)}$. Since the tap settings of the remaining stages are set to zero with the exception of the tap setting associated with the main pulse, the output $1-A^{(2)}$ appears at the output of summing circuit 13 associated with the *n*th of the equalizer stages unchanged and is applied to summer 17. Summer 17 modifies the function $1-A^{(2)}$ to $1+A_f^{(2)}$ and this latter function is applied via a contact on switch 18 to the tap adjusting means 16 associated with the third of the equalizer stages 10. Again, it should be kept in mind that the contribution due to the rear sidelobes is ignored during front end equalization. While the third equalizer stage is not specifically shown in FIG. 1B, it should be clear from what has gone before how this is implemented. The tap settings of the multipliers associated with the third equalizer stages 10 are then modified in accordance with the function $1+A_f^{(2)}$ and the arrangement of FIG. 1B is prepared for the third iteration. Recapitulating, it should be clear that the input function $1-A^{(0)}$ prior to the setting of the third stage has undergone two modifications before arriving at the output of summer 13 associated with the $n^{th}$ of equalizer stages 10. In the first of equalizer stages 10, the input function has been modified by the function $1+A_f^{(0)}$ and, in the second of equalizer stages 10, the input function has been further modified by the function $1+A_f^{(1)}$. Thus, the input function $1-A^{(0)}$ is effectively modified by the product of the two tap settings of the first and second equalizer stages 10 resulting in an output at the second of the equalizer stages 10 of $1-A^{(2)}$.

An input sequence is again applied to the first of equalizer stages 10 where it is modified by the function $1+A_f^{(0)}$. The resulting output $1-A^{(1)}$ is modified in the second of the equalizer stages 10 by the function $1+A_f^{(1)}$ producing at the output thereof the function $1-A^{(2)}$. This function is in turn modified in the third of equalizer stages 10 by the function $1+A_f^{(2)}$ producing at the output of the $n^{th}$ equalizer stage the output $1-A^{(3)}$. This function is then modified in summing circuit 17 to provide the modifying function $1+A_f^{(3)}$ which is applied via a contact on switch 18 to the tap adjusting means 16 associated with the fourth of the equalizer stages 10. The tap settings of multipliers 14 associated with the fourth of equalizer stages 10 are then adjusted in accordance with the function $1+A_f^{(3)}$ and the system of FIG. 1B is prepared for the fourth iteration. Again, it should be appreciated that an input sequence $1-A^{(0)}$ has been modified by three modifying functions $(1+A_f^{(0)})$, $(1+A_f^{(1)})$, $(1+A_f^{(2)})$ prior to setting the taps of the fourth stage to produce a total modifying function which is the product of these functions. The product of these modifying functions multiplied by the input function provides an output represented by the function $1-A^{(3)}$.

Each succeeding iteration is operated on in a manner similar to that shown in connection with previous iterations. Thus, for the $n^{th}$ iteration, an input function $1-A^{(0)}$ is modified by the product of all the modifying functions of the $n$ equalizers. This product when multiplied by the input sequence $1-A^{(0)}$ results in an output $1-A^{(n)A}$.

The description given hereinabove is summarized in the following Table II for the first four iterations using the arrangement of FIG. 1B.

TABLE II

| Number of iterations | Modifying function | Equalizer transfer function prior to next iteration | Output of equalizer stage | Output of Σ 17 |
|---|---|---|---|---|
| Initialize | 1 | | $1-A^0$ | $1+A_f^0$ |
| 1 | $1+A_f^0$ | $(1+A_f^0)$ | $1-A^1$ | $1+A_f^1$ |
| 2 | $1+A_f^1$ | $\prod_{m=0}^{1}(1+A_f^m)$ | $1-A^2$ | $1+A_f^2$ |
| 3 | $1+A_f^2$ | $\prod_{m=0}^{2}(1+A_f^m)$ | $1-A^3$ | $1+A_f^3$ |
| 4 | $1+A_f^3$ | $\prod_{m=0}^{3}(1+A_f^m)$ | $1-A^4$ | $1+A_f^4$ |

where $A^m$ can be expressed in terms of $A^{m-1}$

Referring now to FIG. 1C, it has been indicated that during the $n^{th}$ or last iteration, switch 23 is actuated to connect the output of the last of equalizer stages 10, via contact 26 to a summing circuit 27 which provides at its output a signal sequence represented by the negative of the input sequence. What appears at the output of summing circuit 27 is the negative of the contributions of the rear end portion of the input signal which after being applied to a tap adjusting means 16, provides tap adjustments to multipliers 14 via mechanical linkage 15 with a view to cancelling out the rear side lobe contributions at the sampling instants during the $n+1^{th}$ iteration. During the $n+1^{th}$ interval, the output of the last of equalizer stages 10 is applied via switch 23 and contact 28 to the serially disposed summing circuits 29 and delay sections 30. At this point, it should be appreciated that because the front sidelobe has been reduced to substantially zero, the output of the last of equalizer stages 10 is approximately equal to $1-A_r^{(n)}$. Thus, all that remains is to cancel out the rear sidelobes in the recursive arrangement of FIG. 1C. Because the front sidelobe is substantially zero at this point, the output signal passes unhampered through summing circuits 29 and delay sections 30 until the main pulse encounters threshold or decision circuit 31. Decision circuit 31, of a type well known to those skilled in the electronics art, provides an output of unity when it encounters a signal above a certain threshold. At all other times, it provides an output of zero. Thus, upon encountering the main pulse of the input signal, decision circuit 31 provides an output equal to unity which is applied in parallel to multipliers 14. The output of multipliers 14 is the product of the input and the values of the tap setting applied thereto after the $n^{th}$ iteration. These values are applied to summing circuits 29 where they substantially cancel the contribution of the rear sidelobe at different sampling intervals. In this manner, therefore, the rear sidelobe is equalized reducing the rear sidelobe to substantially zero and the overall distortion, $D$, of the input signal to substantially zero value.

FIGS. 1B and 1C show the general structure of a cascaded automatic recursive equalizer based on the principles described and analyzed hereinabove. The complete equalizer consists of a signal averaging circuit 2, a variable gain, 3, having a gain $G$ and $n$ stages 10 of sub-equalizers in tandem. Signal averaging circuit 2 has the ability to generate output pulses, each of which is the average of a number of input pulses. The input test pulses are spaced according to the number of samples in an input pulse (i.e., so as not to overlap), while the output of the signal averaging circuit is usually spaced at a larger interval according to the expected delay of the main pulse through the equalizer. This circuit is bypassed as soon as the weight adjustments in cascaded stages 10 of the equalizer are completed.

The equalizer input sequence $[\alpha_i^{(0)}] = \alpha_{-N}^{(0)}, \alpha_{-N+1}^{(0)}, \ldots \alpha^{(0)} = 1, \ldots \alpha_N^{(0)}$ is defined to be the sequence of values of the input pulse sampled at times $-N \ldots, 0, \ldots, N$. The procedures for adjusting the gain, $G$, and weights of various stages in the equalizer of FIGS. 1B and 1C in terms of the above analysis is as follows:

1. Pre set $G, \beta_0^{(1)}, \beta_0^{(2)}, \ldots \beta_0^{(n)}$ to unity and all other tap weights to zero. The output is the same as the input except that it is delayed.

2. At the end of the first test pulse from the signal averaging circuit, the weights of the first stage are adjusted in such a way that the weights have values negative to the corresponding front side lobes of the input pulse to this stage. The weight $\beta_0^{(1)}$ of the end tap remains unchanged.

3. Reset the gain, $G$, at the end of the second test pulse. This is to adjust the main pulse, $\beta_0^{(1)}$ of the output sequence to unity.

4. In each of the succeeding iterations, the weights of the $p^{th}$ stage are set by $(2p-1)^{th}$, test pulse in the same fashion according to the input of that stage. That is, for the $p^{th}$ iteration, $\beta_1^{(p)} = -\alpha_1^{(p-1)}$ for $\alpha<0$ and, $\beta_0^{(p)} = 1$ and the gain, $G$, by the $2p^{th}$ test pulse such that the main pulse $\alpha_0^{(p)}$ at the output of that stage is unity.

5. The iteration procedure for the cascaded feed forward path ends after the $n^{th}$ iteration when the output of the front side lobe becomes insignificant.

6. The weights of the feedback path are adjusted such that the weights have the values negative to the corresponding rear side lobes since the rear side lobes can be equalized exactly if the values of the front side lobes are zero. That is:

$\beta^{(n)}_i = -\beta^{(n)}_i \; 0 < i \leq N.$

Theoretically, with the above weight adjustment algorithm, the first stage of the non-recursive sub-equalizers have at least $N+1$ weights ($N$ for the front sidelobes plus the weight corresponding to the main pulse). The number of weights in the $p^{th}$ stage ($p \leq n$) should be at least one less than twice the number of weights of the $(p-1)^{th}$ stage. In practice, the maximum number of delay sections in any stage can be fixed to a reasonable number, if the additional error introduced by the rounding off is negligible. If the total distortion with respect to the normalized main pulse for the $m^{th}$ iteration is $D^{(m)}$ (the sum of the magnitudes of the sidelobes), and the front distortion is $D_f^{(m)}$, the convergence of the present recursive equalizer can be shown to satisfy the following inequalities:

$D^{(m+1)}_f \leq [D_f^{(m)}]^2 + (½)\,[D_f^{(m)}\, D_r^{(m)}]$(for $D_f^{(m)}$ $D_r^{(m)}$)

and $$D^{(m+1)} \leq D^{(m)}$$

where $D^{(m)} = D_f^{(m)} + D_r^{(m)}$

It should be pointed out that the gain, $G$, as shown in FIG. 2B may be deleted under several possible conditions.

1. The gain, $G$, for each iteration may be absorbed in the weight of the corresponding stage by means of an equivalent scaling.

2. The gain, $G$, may be dropped from the weigh adjusting algorithm during the equalization period of front distortion, the weight corresponding to $\beta_0^{(p)}$ remains at unity and other adjusted to the negative of the corresponding sidelobe values. This modification will result in a gradual decrease at the main pulse and slight slow down in the convergence rate of front distortion (this is per stage). However, the number of test pulses can be halved in this case.

3. The gain, $G$, may be dropped from the weight adjusting algorithm while the output main pulse of the $m^{th}$ stage (or iteration) is maintained close to unity by:

$$\alpha_0^{(m)} = \alpha_0^{(m-1)}(2 - \alpha_0^{(m-1)}) - \sum_{l=1}^{N} \alpha_{-l}^{(m-1)} \alpha_l^{(m-1)}$$

$$\cong (1 - \epsilon^{(m-1)})(1 + \epsilon^{(m-1)})$$

$$\cong 1$$

for $$\alpha_0^{(m-1)} = 1 - \epsilon^{(m-1)}$$

The result is similar to the in 2 above, except that the convergence rate of front distortion may be slightly lower than 2.

The following TABLE III shows the results obtained using the technique of the present invention on a general purpose computer where front sidelobe equalization is carried out for 2 iterations.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method for equalizing an electrical signal comprising the steps of:

applying for $m$ iteration an electrical signal sequence represented by the function $1-A^{(0)}$ to the input of an equalizer arrangement having a plurality of adjustable tap settings;

equalizing only the front portion of said signal to provide for $m$ iterations an output signal represented by the function $1-A^{(m)}$ where $m = 1, 2, 3, \ldots, n$, $1-A^{(m)} = 1-A_f^{(m)} - A_r^{(m)}$, $1-A^{(n)} \cong 1-A_r^{(n)}$ $$1-A^{(0)} = \Lambda^{(0)} = \alpha_{-N}^{(0)}Z^N + \ldots + \alpha_{-1}^{(0)}Z^1 + {}_0^{(0)} + \alpha_1^{(0)}Z^{-1} + \ldots + \alpha_N^{(0)}Z^{-N}$$

and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse, $A_f^{(m)}$ and $A_r^{(m)}$ are the contributions to the signal distortion of the front and rear side lobes, respectively, and modifying after the $n^{th}$ iteration said output signal represented by the function $1-A^{(n)}$ by its reciprocal in a recursive equalizer stage having a plurality of adjustable tap settings to reduce the rear end distortion of said signal to a value approaching zero.

2. A method according to claim 1 further including the step of applying said electrical signal to a signal averaging circuit to generate an output signal which is the average of a number of input signals.

TABLE III

| | | | | | | | | | | |
|---|---|---|---|---|---|---|---|---|---|---|
| Front sidelobe equalization: | | | | | | | | | | |
| Initial input sequence: $1-A^0$ | .005 | −.064 | −.138 | 1 | .315 | −.131 | −.059 | | | |
| Tap setting of the first iteration | −.005 | .064 | .138 | 1 | 0 | 0 | 0 | | | |
| Output sequence after first iteration $1-A^1$ | 0 | .006 | −.0027 | −.0177 | −.0206 | .0208 | 1.0353 | .2931 | −.1391 | −.059 |
| Tap setting of the second iteration | 0 | −.006 | .0027 | .0177 | .0206 | −.0208 | .9647 | 0 | 0 | 0 |
| Output sequence after second iteration $1-A^2$ | −.0004 | −.0007 | .0003 | .0029 | .0058 | .0019 | .9887 | .2845 | −.1330 | −.0569 |
| Feedback sequence after second iteration $1-A_r^2$ | 1 | −.2845 | .1330 | .0569 | | | | | | |
| Output sequence after the decision feedback introduced | −.0001 | −.0004 | −.0005 | .0004 | .0027 | .0051 | .0009 | 1.0006 | .0002 | .0001 |
| Eye opening before decision feedback circuit, percent | 98.9 | | | | | | | | | |

The main advantages offered by the cascaded recursive equalizer embodiment are as follows:

Fast convergence (settling time) because of the recursive arrangement of the equalizer.

Less hardware required in actual implementation in comparison with non-recursive equalizer types.

Economical implementation is possible using large scale integration circuit technology.

Insensitivity to channel noise due to the use of signal averaging.

Digital implementation eliminates unnecessary build-up of circuit noise.

In the practice of the foregoing invention, no specific implementation for the equalizer stages 10 has been given. However, commercially available transversal filters may be adapted in a manner well known to those skilled in the art to produce the equalizer stages of the present invention.

3. A method according to claim 1 wherein the step of equalizing said signal includes the step of:

adjusting initially said plurality of tap settings to zero with the exception of the tap settings which correspond to the main pulse, the latter being adjusted to unity.

4. A method according to claim 1 wherein the step of equalizing said signal includes the steps of:

passing said electrical signal through $m$ equalizer stages, modifying said output signal in a summing circuit to provide a modified signal represented by the function $1+A^{(m-1)}$ where $1+A^{(m-1)} = 1+A_f^{(m-1)} + A_r^{(m-1)}$, feeding the front end portion of said last mentioned signal ($1+A_f^{(m-1)}$) to a tap adjusting means, and, modifying the tap settings of the $m^{th}$ equalizer stage in accordance with the function $1+A_f^{(m-1)}$.

5. A method according to claim 1 further including the step of:

normalizing the function $1-A^{(0)}$ at the beginning of each iteration to normalize the main pulse of the electrical signal sequence to unity.

6. A method according to claim 1 wherein the step of modifying the signal represented by the function $1-A^{(n)}$ includes the steps of:

applying said signal to a summing circuit during the $n^{th}$ iteration which provides at its output the negative of the contribution of the rear sidelobe at the sampling instants represented by the function $A_r^{(n)}$, feeding the signal represented by said last mentioned function to a tap adjusting means, modifying the tap settings of said recursive stage in accordance with the function $A_r^{(n)}$, applying during the interval after the $n^{th}$ iteration, said output signal represented by the function $1-A^{(n)}$ to said recursive equalizer stage, sensing the main pulse associated with said output signal, and, feeding back to said recursive equalizer stage the signal represented by the function $A_r^{(n)}$ to cancel out the contributions of the rear sidelobes at the sampling instants represented by the function $-A_r^{(n)}$.

7. A method for equalizing an electrical signal sequence represented by the function $1-A^{(0)}$ comprising the steps of:

applying said electrical signal for $m$ iterations to the input of $m$ equalizer stages each of which have adjustable tap settings;

modifying said electrical signal by adjusting said tap settings of the $m^{th}$ equalizer in accordance with the function $1+A_f^{(m-1)}$ to produce successive outputs at each of said stages for successive iterations as represented by the function $1-A^{(m)}$ where $m=1, 2, 3, \ldots, n$, $1-A^{(m)}=1-A_f^{(m)}-A_r^{(m)}$, $1-A^{(0)}=\Lambda^{(0)}=\alpha_{-N}^{(0)}z^N+\ldots+\alpha_{-1}(o)z^1+\alpha_0^{(0)}+\alpha_1^{(0)}z^{-1}+\ldots+\alpha_N^{(0)}z^{-N}$ and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse, $A_f^{(m)}$ and $A_r^{(m)}$ are the contributions to the signal distortion of the front and rear side lobes, respectively, and modifying after the $n^{th}$ iteration the function $1-A^{(n)}\cong 1-A_r^{(n)}$ by its reciprocal in a recursive equalizer stage having a plurality of adjustable tap settings to reduce the rear end distortion of said signal to a value approaching zero.

8. A method according to claim 7 wherein the step of modifying said electrical signal includes the steps of:

applying said output signal after each iteration to a summing circuit to change said signal to a signal represented by the function $1+A^{(m-1)}$ where $1+A^{(m-1)}=1+A_f^{(m-1)}+A_r^{(m-1)}$, determining the value of the last mentioned function for each sampling point relating to the front portion only $(1+A_f^{(m-1)})$ of said electrical signal sequence, and, adjusting said adjustable tap settings on the $m^{th}$ of said equalizer stages according to the previously determined value.

9. A method according to claim 7 further including the step of:

normalizing the function $1-A^{(0)}$ at the beginning of each iteration to normalize the main pulse of said electrical signal sequence to unity.

10. A method according to claim 7 further including the step of:

adjusting initially the tap settings of said equalizer stages to zero with the exception of tap settings which correspond to the main pulse of said sequence the latter being adjusted to unity.

11. A method according to claim 7 wherein the step of modifying the signal represented by the function $1-A^{(n)}$ by its reciprocal includes the steps of:

applying said signal to a summing circuit during the $n^{th}$ iteration which provides at its output the negative of the contribution of the rear sidelobes at the sampling instants represented by the function $A_r^{(n)}$, feeding the signal represented by said last mentioned function to a tap adjusting means, modifying the tap settings of said recursive stage in accordance with the function $A_r^{(n)}$, applying during the interval after the $n^{th}$ iteration, said output signal represented by the function $1-A^{(n)}$ to said recursive equalizer stage, sensing the main pulse associated with said output signal, and, feeding back to said recursive equalizer stage the signal represented by the function $A_r^{(n)}$ to cancel out the contributions of the rear sidelobes at the sampling instants represented by the function $-A_r^{(n)}$.

12. Apparatus for equalizing an electrical signal comprising:

a signal source for producing an electrical signal;

a communications medium connected to said signal source which introduces distortion on said electrical signal to provide a distorted electrical signal represented by the function $1-A^{(0)}$ and, means connected to said communications medium for equalized the front portion only of said distorted electrical signal to provide at the output thereof an output signal represented by the function $1-A^{(m)}$ for $m$ iterations where $m=1, 2, 3, \ldots, n$, wherein $1-A^{(m)}=1-A_f^{(m)}-A_r^{(m)}$, $1-A^{(n)}\cong 1-A_r^{(n)}$ $1-A^{(0)}=\Lambda^{(0)}=\alpha_{-N}^{(0)}z^N+\ldots+\alpha_{-1}^{(0)}z^1+\alpha_0^{(0)}+\alpha_1^{(0)}z^{-1}+\ldots+\alpha_N^{(0)}z^{-N}$ and is the output of a transmission medium in response to a unit pulse input decomposed as the main pulse and side lobes, $\alpha$ is the amplitude value of a signal at sampling instant and the subscripts associated with the term $\alpha$ are the numbers of the sampling instants before and after the main pulse, $A_f^{(m)}$ and $A_r^{(m)}$ are the contributions to the signal distortion of the front and rear side lobes, respectively, and means operable after the $n^{th}$ iteration for modifying the function $1-A^{(n)}$ by its reciprocal connected to said equalizing means to reduce the rear end distortion of said signal to a value approaching zero.

13. Apparatus according to claim 12 further including means interposed between said communications medium and said equalizing means for averaging said distorted electrical signal to generate an output signal which is the average of a plurality of input signals.

14. Apparatus according to claim 12 wherein said means for modifying the function $1-A^{(n)}$ by its reciprocal includes:

means for converting said signal during the $n^{th}$ interation to provide at the output thereof the negative of the contributions of the rear sidelobe at the sampling instants as represented by the function $A_r^{(n)}$ connected to the output of said equalizing means, tap adjusting means responsive to the output of said converting means for providing tap setting outputs which are proportional to the function $A_r^{(n)}$ at the sampling instants, a plurality of multipliers, a plurality of adjustable tap settings on said multipliers connected to said tap setting means responsive to said tap setting outputs which are adjusted during said $n^{th}$ iteration, a plurality of summing circuits and delay devices arranged in an interleaving series manner connected to the output of said equalizer means during the interval succeeding the $n^{th}$ iteration each of said summing circuits being connected to a different associated multiplier, threshold means responsive to the main pulse of said electrical signal operative in the interval after said $n^{th}$ iteration for providing an output via said multipliers to said summing circuits which cancels the contribution of the rear sidelobe at the sampling instants as represented by the function $-A_r^{(n)}$.

15. Apparatus according to claim 12 wherein said means for equalizing said distorted electrical signal includes a plurality of equalizer stages each having a plurality of adjustable tap settings the output of one stage being connected to the input of a succeeding stage, means connected to the last of said equalizer stages for modifying said output signal to provide the function $1+A^{(m-1)}$ wherein $1+A^{(m-1)} = 1+A_f^{(m-1)} + A_r^{(m-A01)}$ and, means connected to said modifying means and said adjustable tap settings for adjusting the tap settings associated with $m^{th}$ equalizer stage in accordance with the function $1+A_f^{(m-1)}$.

16. Apparatus according to claim 15 wherein said means for modifying said output signal includes a summer circuit which converts the function $1-A^{(m-1)}$ to $1+A^{(m1)}$.

17. Apparatus according to claim 15 wherein said means for adjusting includes drive means connected to said adjustable tap settings responsive to the signal sequence represented by the function $1+A_f^{(m-1)}$.

18. Apparatus according to claim 15 wherein each said equalizer stage includes a tapped delay line.

19. Apparatus according to claim 15 wherein each said equalizer stage includes a shift register.

20. Apparatus for equalizing an electrical signal represented by the function $1-A^{(0)}$ comprising:

means for applying said electrical signal for $m$ iterations to the input of $m$ equalizer stages each of which have a plurality of adjustable tap settings, the output of one stage being connected to the input of a succeeding stage, and means connected to the last of said plurality of equalizers and said plurality of adjustable tap settings for modifying said tap settings to produce successive outputs at the $m^{th}$ of said equalizer stages for successive iterations as represented by the function $1-A^{(m)}$ where $m = 1, 2, 3, \ldots, n$, $1-A^{(m)} = 1-A_f^{(m)}-A_r^{(m)}$, $1-A^{(0)} = \Lambda^{(0)} = \alpha_{-N}^{(0)} z^{N} + \ldots + \alpha_{-1}^{(0)} z^{1} + \alpha_0^{(0)} + \alpha_1^{(0)} z^{-1} + \ldots + \alpha_N^{(0)} z^{-N}$ and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse, $A_f^{(m)}$ and $A_r^{(m)}$ are the contributions to the signal distortion of the front and rear sidelobes, respectively, and means operable after the $n^{th}$ iteration for modifying the function $1-A^{(n)} \cong 1-A_r^{(n)}$ by its reciprocal connected to the last of said equalizer stages to reduce the total distortion of said signal to a value approaching zero.

21. Apparatus according to claim 20 wherein said means for modifying the function $1-A^{(n)}$ by it reciprocal includes:

means for converting said signal during the $n^{th}$ iteration to provide at the output thereof the negative of the contributions of the rear sidelobe at the sampling instants as represented by the function $A_r^{(n)}$ connected to the output of said equalizing means, tap adjusting means responsive to the output of said converting means for providing tap setting outputs which are proportional to the function $A_r^{(n)}$ at the sampling instants, a plurality of multipliers, a plurality of adjustable tap settings on said multipliers connected to said tap setting means responsive to said tap setting outputs which are adjusted during said $n^{th}$ iteration, a plurality of summing circuits and delay devices arranged in an interleaving series manner connected to the output of said equalizer means during the interval succeeding the $n^{th}$ iteration each of said summing circuits being connected to a different associated multiplier, threshold means responsive to the main pulse of said electrical signal operative in the interval after said $n^{th}$ iteration for providing an output via said multipliers to said summing circuits which cancels the contribution of the rear sidelobe at the sampling instants as represented by the function $-A_r^{(n)}$.

22. Apparatus according to claim 20 wherein said means for modifying includes a summer circuit which converts the output of the $m^{th}$ stage to a signal as represented by the function $1-A^{(m-1)}$ to $1+A^{(m-1)}$, where $1+A^{(m-1)} = 1+A_f^{(m-1)}+A_r^{(m-1)}$.

23. Apparatus according to claim 22 further including tap adjusting means connected to said summer and each of said equalizer stages for converting that portion of the output electrical signal of said summer circuit represented by the function $1+A_f^{(m-1)}$ to mechanical motion and linkages connected between said tap adjusting means and said plurality of adjustable tap settings.

24. Apparatus for equalizing an electrical signal sequence represented by the function $1-A^{(0)}$ comprising:

means for applying said electrical signal for $m$ iterations to the input of $m$ cascaded equalizer stages each of which have a plurality of adjustable tap settings the output of one stage being connected to the input of a succeeding stage; and means for modifying said electrical signal sequence by adjusting said tap settings in accordance with the function $1+A_f^{(m-1)}$ to produce successive outputs at each of said equalizer stages for successive iterations as represented by the function $1-A^{(m)}$ where m = 1, 2, 3,...,n, $1-A^{(m)}=1-A_f^{(m)}-A_r^{(m)}$ $1-A^{(0)}=\Lambda^{(0)}=\alpha_{-N}^{(0)}z^N+\ldots+\alpha_{-1}^{(0)}z^1+\alpha_0^{(0)}+\alpha_1^{(0)}z^{-1}+\ldots+$
$\alpha_N^{(0)}z^{-N}$ and is the output of a transmission medium in response to a unit pulse input decomposed as the main pulse and side lobes, $\alpha$ is the amplitude value of a signal at a sampling instant and the subscripts associated with the term $\alpha$ are the numbers of the sampling instants before and after the main pulse, $A_f^{(m)}$ and $A_r^{(m)}$ are the contributions to the signal distortion of the front and rear side lobes, respectively, and means operable after the $n^{th}$ iteration for modifying the function $1-A^{(n)}$ $1-A_r^{(n)}$ by its reciprocal connected to the last of said equalizer stages to reduce the total distortion of said signal to a value approaching zero.

25. Apparatus according to claim 24 wherein said means for modifying includes a summing circuit connected to the last of said plurality of equalizer stages to change said signal to a signal represented by the function $1+A^{(m-1)}$ wherein $1+A^{(m-1)}+A_r^{(m-1)}$, means connected to said summer circuit for determining the value of that portion of said last mentioned function for a plurality of sampling points of said electrical signal sequence represented by the function $1+A_f^{(m-1)}$, and means for adjusting each of said plurality of tap settings on the $m^{th}$ of said plurality of equalizer stages.

26. Apparatus according to claim 24 wherein said means operable after the $n^{th}$ iteration for modifying the function $1-A^{(n)}$ by its reciprocal includes:

means for converting said signal during the $n^{th}$ iteration to provide at the output thereof the negative of the contributions of the rear sidelobe at the sampling instants as represented by the function $A_r^{(n)}$ connected to the output of said equalizing means, tap adjusting means responsive to the output of said converting means for providing tap setting outputs which are proportional to the function $A_r^{(n)}$ at the sampling instants, a plurality of multipliers, a plurality of adjustable tap settings on said multipliers connected to said tap setting means responsive to said tap setting outputs which are adjusted during said $n^{th}$ iteration, a plurality of summing circuits and delay devices arranged in an interleaving series manner connected to the output of said equalizer means during the interval succeeding the $n^{th}$ iteration each of said summing circuits being connected to a different associated multiplier, threshold means responsive to the main pulse of said electrical signal operative in the interval after said $n^{th}$ iteration for providing an output via said multipliers to said summing circuits which cancels the contribution of the rear sidelobe at the sampling instants as represented by the function $-A_r^{(n)}$.

* * * * *